May 22, 1956   H. L. KUHLENSCHMIDT ET AL   2,746,619
TRUCK LOADING OR UNLOADING MECHANISM
Filed May 20, 1954   3 Sheets-Sheet 1
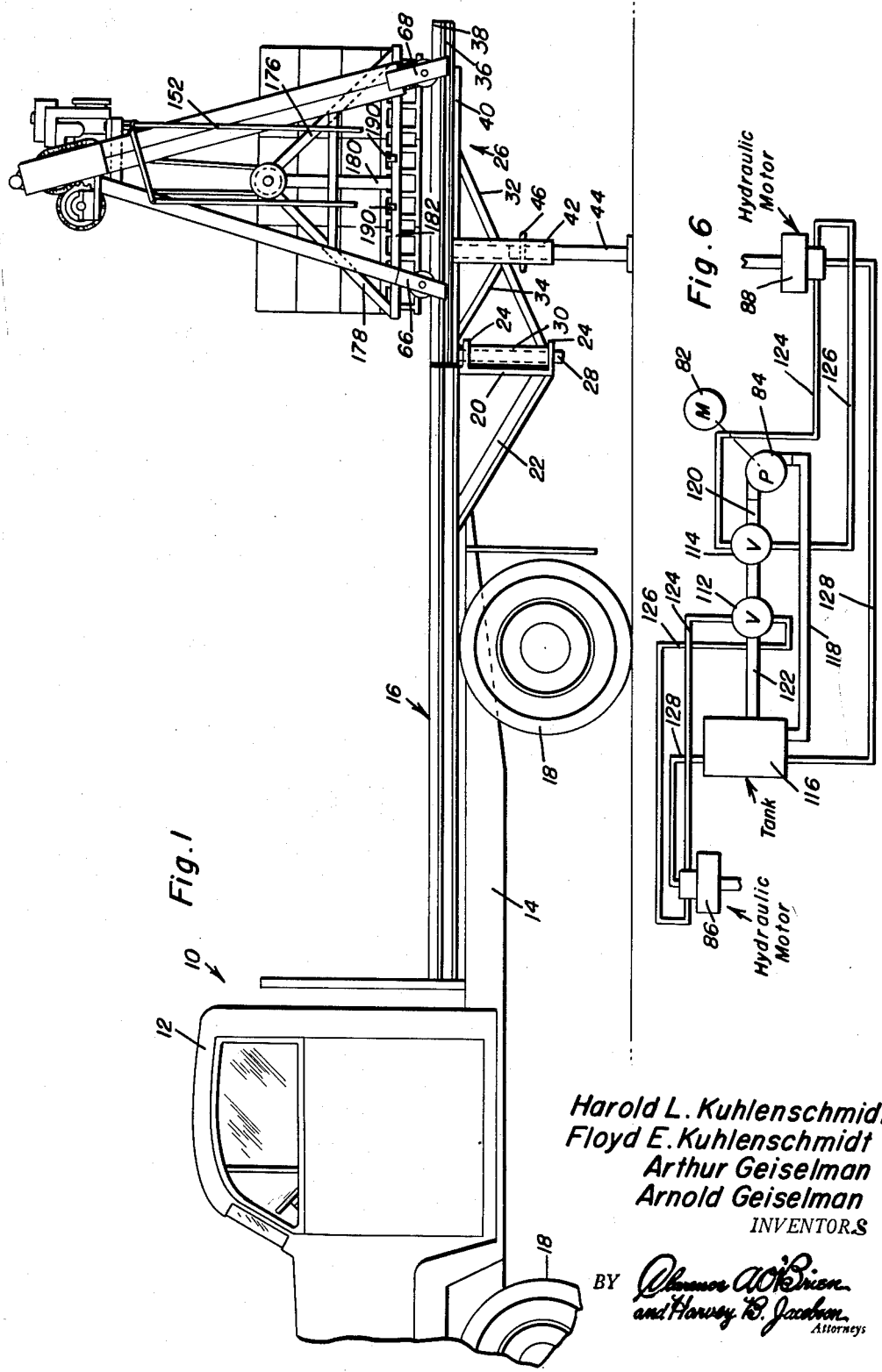
Harold L. Kuhlenschmidt
Floyd E. Kuhlenschmidt
Arthur Geiselman
Arnold Geiselman
INVENTORS
BY Clarence A. O'Brien
and Harvey B. Jacobson
Attorneys May 22, 1956    H. L. KUHLENSCHMIDT ET AL    2,746,619
TRUCK LOADING OR UNLOADING MECHANISM
Filed May 20, 1954    3 Sheets-Sheet 2
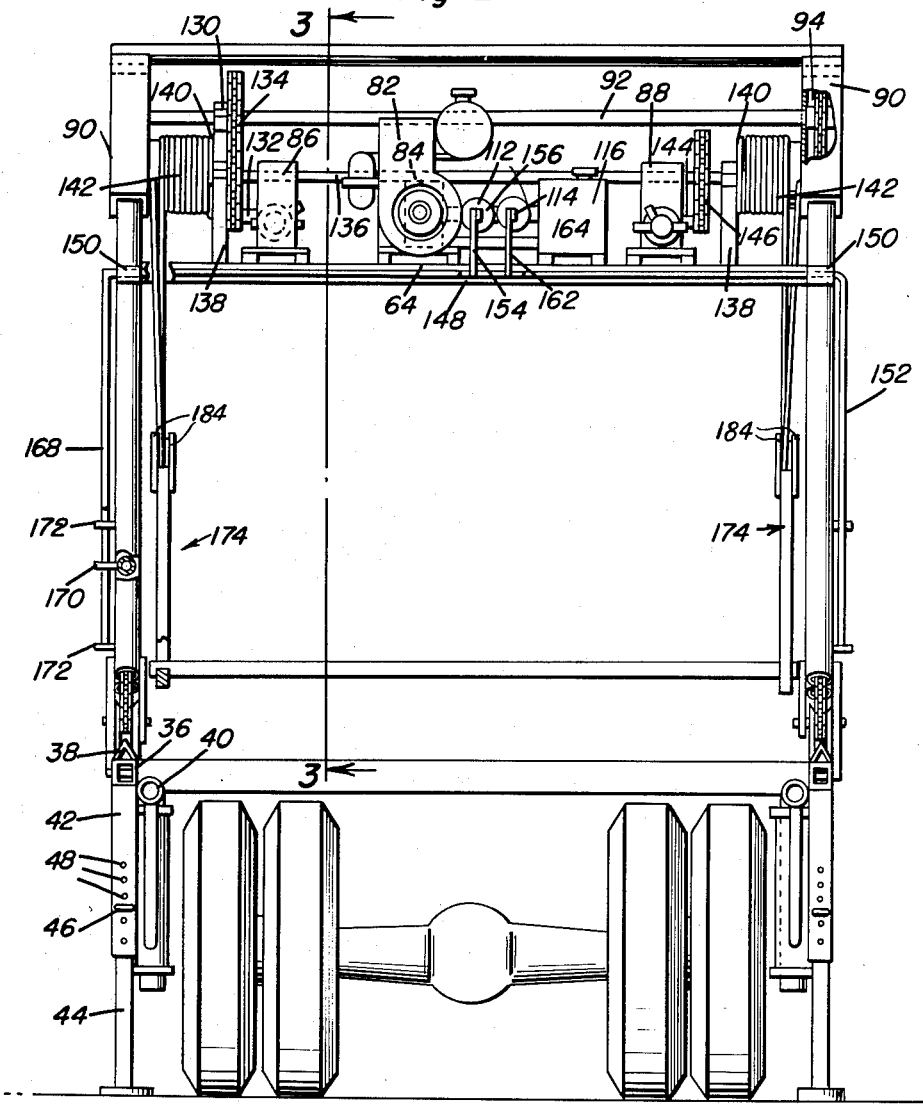
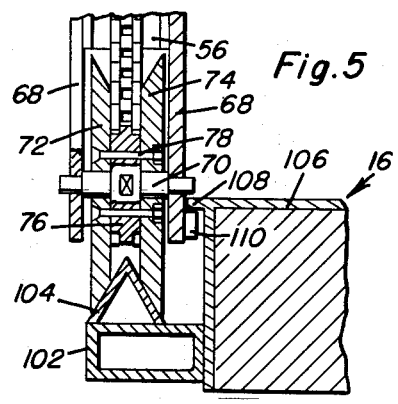
Harold L. Kuhlenschmidt
Floyd E. Kuhlenschmidt
Arthur Geiselman
Arnold Geiselman
INVENTORS.
BY Clarence A. O'Brien
and Harvey B. Jacobson
Attorneys

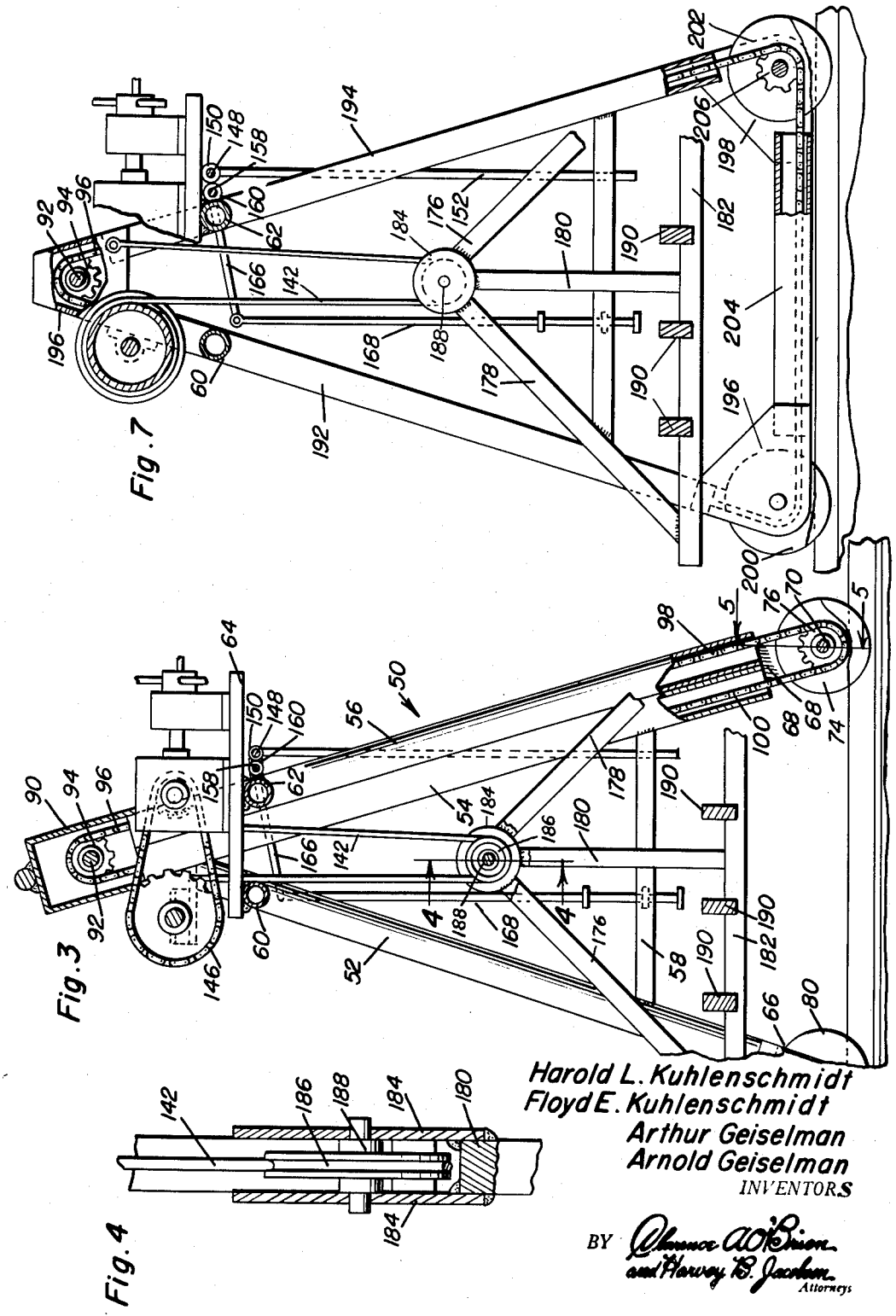

United States Patent Office 2,746,619
Patented May 22, 1956

2,746,619

TRUCK LOADING OR UNLOADING MECHANISM

Harold L. Kuhlenschmidt, Floyd E. Kuhlenschmidt, Arthur Geiselman, and Arnold Geiselman, Elberfeld, Ind., assignors to Elberfeld Manufacturing Co., Inc., Elberfeld, Ind., a corporation of Indiana Application May 20, 1954, Serial No. 431,196

3 Claims. (Cl. 214—75)

This invention relates to loading mechanism and has for its primary object the provision of a loading mechanism assembly disposed on a loading platform or bed of an automotive truck and movable longitudinally therealong to stack and load material on the bed.

One important feature and object of this invention resides in the provision of an extremely light yet rigid mechanism which will be capable of handling large loads to expedite the loading and unloading process and which, due to its light weight construction, will not detrimentally affect the pay load which the associated vehicle may carry.

An important safety feature of the invention resides in the provision of a track assembly cooperable with guard fingers on the movable carriage which prevent tipping of the carriage and lifting of the carriage wheels from the tracks.

A still further important feature of this invention is incorporated in the ready adaptability of the loader mechanism to any conventional truck bed.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of an automotive truck equipped with the loader mechanism and showing the same in the process of placing material on the truck bed;

Figure 2 is a rear elevational view of the assembly shown in Figure 1;

Figure 3 is a longitudinal vertical section taken substantially along the plane of section line 3—3 in Figure 2;

Figure 4 is an enlarged vertical section taken substantially along the plane of section line 4—4 in Figure 3;

Figure 5 is an enlarged vertical section taken along the plane of section line 5—5 in Figure 3;

Figure 6 is a diagrammatic view of the hydraulic assembly of the loader mechanism; and Figure 7 is a side elevational view showing a modified form of construction.

Referring now more particularly to Figures 1 and 2, reference numeral 10 indicates generally an automotive truck equipped with the usual cab 12 and having the usual longitudinal frame members 14 supporting a bed assembly indicated generally by the reference character 16, the entire unit being movably supported by the wheels 18. For the purpose of adapting such a truck with the present invention, the bed or loading platform 16 is provided at its rear end and on opposite sides thereof with the hanger frames 20 suitably braced as by the members 22 to the undercarriage of the loading platform, the hanger frame including the horizontally disposed rearwardly projecting arm portions 24. Associated with each of the hanger frames is a track extension assembly indicated generally by the reference character 26 which includes a depending pivot pin 28 projecting through suitable apertures in the hanger frame arms 24 and projecting through a sleeve 30 disposed between these arms in a manner shown most clearly in Figure 1. The sleeve is provided with a suitable brace member 32 projecting therefrom to the undersurface of an associated extension assembly, it being manifest that further bracing 34 may be provided if needed.

These extensions proper consist of the elongated base members 36 which, as will be seen from Figure 2, are preferably of open rectangular configuration in cross section and which support on their upper surfaces the inverted angle members 38. Tubular frame members 40 are connected at their forward ends to the depending pins 28 and are supported adjacent their rearward ends by the previously mentioned braces 32 and, as will be seen in Figure 2, these frame members 40 are rigidly secured to the members 36 by any suitable manner, such as welding or the like. A supporting leg assembly is associated with each track extension assembly and these legs incorporate depending sleeve members or tubes 42 secured to the undersurface of the members 36 and telescopically receiving the foot members 44 which carry the transverse pins 46 selectively receivable in one of the several apertures 48 provided in the sleeves 42. In this manner, each of the track extension assemblies is supported directly from the ground surface.

Referring now more particularly to Figure 3, it will be seen that the loading mechanism consists essentially of a carriage assembly indicated generally by the reference character 50 embodying spaced side frame assemblies constructed from the leg members 52, 54, and 56. Two of the leg members, 54 and 56 are rigidly secured together in side-by-side relation as shown, and are joined at their upper ends or adjacent thereto to the first mentioned leg member 52. The leg members are spaced apart at their lower ends so as to present an inverted V-shape and may be interconnected by suitable brace members 58 to impart a maximum of rigidity to the side frame assemblies. A pair of horizontal stringer members 60 and 62 extend between and rigidly interconnect the upper ends of the side frames and a horizontal platform 64 is rigidly secured to the stringers in the manner shown most clearly in Figure 3.

A pair of extension plates 66 are secured to the lower ends of the legs 52 and a pair of extension plates 68 are secured to the lower ends of the rigidly interconnected legs 54 and 56.

As seen most clearly in Figure 5, an axle member 70 is journaled between the extension plate 68 and a pair of beveled wheel flange members 72 and 74 are rigidly connected to the center portion of the axle, a sprocket member 76 being sandwiched therebetween. The members 72, 74, and 76 may either be rigidly interconnected by means of the fasteners 78 or may be rigidly secured directly to the center portion of the axle 70, whichever is preferred. The wheel assemblies 80 which are journaled between the extension plates 66 are of similar construction to the assemblies above described with the exception that an annular spacer is substituted for the sprocket 76.

As seen most clearly in Figure 2, the platform 64 provides a support for an internal combustion engine 82 which drives a pump 84, also mounted on the platform, for supplying fluid to hydraulic motors 86 and 88. The upper end of the combined leg members 54 and 56 are provided with the end caps or housings 90 within which the opposite ends of a horizontal shaft 92 projects, these ends being provided with the sprocket members 94 within the housing over which endless flexible chains 96 are trained with one flight 98 thereof passing through the legs 56 and the other flight 100 thereof passing through the leg 54, all legs being of tubular configuration. Thus, the chain 96 is trained about both the sprocket 94 and the sprocket 76 such that rotation of the shaft 92 will effect rotation of the wheel members 72 and 74 to move the carriage along the trackway.

In this respect, it is to be noted that the trackway which is attached to the truck bed or loading platform 16 consists of a base 102, one of which is connected at each side of the loading platform on the vertical side face thereof and which forms a support or base for inverted angle members 104, upon which the wheels are engaged. To obviate tipping of the carriage 50 from its trackways, the longitudinal side edges of the truck bed or loading platform are provided with the guard pieces 106 which present lateral side flanges 108 projecting from the truck bed and beneath which guard fingers 110 secured to the lower end of the extension plate 68 project, preventing lifting of the wheels from the trackway more than a very limited amount.

As seen most clearly in Figure 6, the hydraulic system for the hydraulic motors 86 and 88 includes in addition to the previously mentioned internal combustion engine 82 and pump 84, a pair of valve members 112 and 114 manually controlled in a manner presently set forth and a reservoir or sump 116, all members being mounted on the platform 64. The pump 84 is provided with an inlet line 118 connected to the reservoir 116 and an outlet line 120 leads to the valve members 112 and 114, a return line 122 being also provided. The valves 112 and 114 are of the three position type and they direct the flow of fluid from the pump 84 either to the return line 122 or the lines 124 and 126 leading to opposite sides of the hydraulic motors 86 and 88 for driving the same in opposite directions. Of course, a return line 128 is associated with each of the hydraulic motors.

The previously mentioned horizontal shaft 92 is provided with a sprocket member 130 and the hydraulic motor 86 has an output shaft 132 carrying a mating sprocket over which a chain 134 is trained for imparting rotation to the shaft 92. A second horizontal shaft 136 is carried by suitable bearing posts 138 extending upwardly from the platform 64 and has connected to its opposite ends suitable drum members 140 about which cables 142 are wound. The motor 88 is connected through its drive shaft 144 and a suitable sprocket and chain 146 to the shaft 136 for selectively driving the same and imparting rotation to the drums 140.

For the purpose of controlling the valve 112, a shaft 148 is journaled between the side frame assemblies in the bearing members 150 and this shaft is provided with downturned end portions 152 disposed within easy reach of an operator standing on the ground at either side of the truck bed and this shaft carries a pitman arm 154 connected to a control plunger 156 on the valve 112 such that when the handle portion 152 is swung forwardly the motor 86 will drive the carriage forwardly along the truck bed and when swung rearwardly will impart a corresponding motion to the carriage. The valve 114 is controlled in a somewhat similar manner, being connected to a horizontal transverse shaft 158 journaled to the side frame assemblies by means of the bearings 160, the connection being effected through means of a pitman arm or lever 162 connected to the valve plunger 164. The opposite ends of this shaft 158 are provided with forwardly projecting arm portions 166 and a control link 168 is pivotally connected thereto and depends therefrom through a bracket 170 apertured for this purpose. Stop members 172 are provided on the link at spaced points therealong and the operation of this control link is such that when the link is pushed upwardly such that the lower stop 172 engages the bracket 170, the drum 140 will be actuated to wind the cable 142 thereon and raise the elevator frames 174.

As will be seen most clearly in Figure 3, each elevator frame includes angularly depending leg portions 176 and 178 and a vertical leg portion 180 connected at their lower ends to the horizontal bar 182. The upper ends of these leg members are secured between a pair of opposed plate members 184 which journal a pulley member 186 therebetween by means of a suitable axle or pivot pin 188. The cable 142 extends downwardly from the drum 140 around the pulley 186 and back to a point of attachment on the frame of the machine.

The elevator assembly is particularly adapted for use in elevating a load of cinder-blocks to the level of the truck bed so that the carriage may properly place the load upon the truck bed and for this purpose it will be observed that the cinder-blocks or cement-blocks are arranged in the manner shown in Figure 1 and horizontal support bars 190 are passed through the lowermost cinder-blocks and are engaged at their opposite ends on the horizontal bar 182 of the elevator frame. The members 190 are provided with notches adjacent their opposite ends for engagement over the horizontal bars 182 of the elevator frame to prevent disengagement therefrom during the loading operation.

Referring now more particularly to Figure 7 wherein a modified form of the invention is shown, it will be seen that the only difference between this form of the invention and that previously described resides in the particular construction of the side frame assemblies wherein these side frame members are composed of a pair of divergent leg members 192 and 194 connected together at their upper ends by the housing member 196 which journals one end of the shaft 92 therein. The lower ends of these legs are provided with extension plates 196 and 198 on opposite sides thereof for journaling the wheel members 200 and 202 therebetween, the extension plates themselves being interconnected between the lower ends of the leg members by means of a horizontal tubular member 204 in the manner shown. Thus, the wheel drive chain 96 is trained about the drive sprocket 94, the rear wheel drive sprocket 206 and a forward wheel drive sprocket (not shown) whereby both the wheel assemblies 200 and 202 are driven. The drive chain, of course, passes through the leg members 192 and 194 as well as the horizontal tubular member 204 such that the entire drive chain assembly is enclosed and encased within the frame structure of the side frame assemblies.

It will be appreciated that the loading mechanism formed by the assemblies above described are of extremely light weight construction in their use of rigid tubular members in the side frame assembly construction so as to maintain the over-all weight of the loading mechanism at a practical minimum to permit an associated truck to carry as large a load as is possible. In addition to the light weight construction afforded by the use of the tubular members, the drive mechanisms for the wheels of the elevator carriage are encased and protected within the confines of the frame assemblies in the manner which has been set forth previously.

The loading mechanism is capable of very deft handling of cinder, concrete or similar blocks, so much so that it is possible to stack such blocks from the bed of a truck to a height of eight feet. The loading mechanism, due to the fact that it supports a load from the cross pieces interconnecting the upright legs, is capable of movement to any position on a truck bed even after such bed is fully loaded, permitting the loading mechanism to be positioned adjacent the cab of the truck, and thus more advantageously distribute the load on the tires, when the truck is proceeding to its destination.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In combination with an automotive truck having a driver's cab and a loading platform to the rear of the cab, a carriage supported for movement longitudinally of the loading platform, comprising: a pair of spaced, vertical side frame assemblies interconnected at their upper ends by a horizontal cross member, a pair of spaced winch members mounted on said cross member, means on said cross member for selectively driving said winch members, an elevator platform connected with said winch members for vertical movement thereby, said side frame assemblies including tubular leg members, said leg members having plate-like extensions secured on opposite sides of the lower ends thereof, a wheel journaled between the extension of each leg member, a pair of spaced track members secured to said loading platform, said wheels being engaged upon said track members for guided movement therealong, means including an endless flexible element running through one of said leg members for driving the corresponding wheel, and a laterally projecting finger or at least one extension at each side of the carriage projecting under a portion of the loading platform to prevent tilting of the carriage and disengagement of the wheels from the tracks.

2. In an automotive truck having a loading platform, a pair of spaced track members secured to the loading platform longitudinally thereof, a pair of track extension members, said track extension members being connected to the rear of said loading platform for movement about vertical pivot axes between a position folded against the rear of the loading platform and a position projecting rearwardly therefrom in alignment with said track members, a loader carriage supported for movement longitudinally along said track members, including a pair of spaced, vertical side frame assemblies interconnected at their upper ends by a horizontal cross member, a pair of spaced winch members mounted on said cross member, means on said cross member for selectively driving said winch members, an elevator platform connected with said winch members for vertical movement thereby, said side frame assemblies including tubular leg members, said leg members having plate-like extensions secured on opposite sides of the lower ends thereof, a wheel journaled between the extension of each leg member, a pair of spaced track members secured to said loading platform, said wheels being engaged upon said track members for guided movement therealong, means including an endless flexible element running through one of said leg members for driving the corresponding wheel, and a laterally projecting finger or at least one extension at each side of the carriage projecting under a portion of the loading platform to prevent tilting of the carriage and disengagement of the wheels from the tracks.

3. In an automotive truck having a loading platform, a pair of spaced track members secured to the loading platform longitudinally thereof, said track members being secured along the opposite side edges of said loading platform and said platform including laterally projecting flanges along its opposite sides above said track members, a pair of track extension members, said track extension members being connected to the rear of said loading platform for movement about vertical pivot axes between a position folded against the rear of the loading platform and a position projecting rearwardly therefrom in alignment with said track members, a loader carriage supported for movement longitudinally along said track members, including a pair of spaced, vertical side frame assemblies interconnected at their upper ends by a horizontal cross member, a pair of spaced winch members mounted on said cross member, means on said cross member for selectively driving said winch members, an elevator platform connected with said winch members for vertical movement thereby, said side frame assemblies including tubular leg members, said leg members having plate-like extensions secured on opposite sides of the lower ends thereof, a wheel journaled between the extension of each leg member, a pair of spaced track members secured to said loading platform, said wheels being engaged upon said track members for guided movement therealong, means including an endless flexible element running through one of said leg members for driving the corresponding wheel, and a laterally projecting finger or at least one extension at each side of the carriage projecting under said flanges to prevent tilting of the carriage and disengagement of the wheels from the tracks.

References Cited in the file of this patent

UNITED STATES PATENTS

| | | |
|---|---|---|
| 2,156,424 | Barnard | May 2, 1939 |
| 2,292,870 | Dixon | Aug. 11, 1942 |
| 2,504,232 | Smith | Apr. 18, 1950 |
| 2,557,253 | Belden | June 19, 1951 |
| 2,605,914 | Hale | Aug. 5, 1952 |
| 2,621,811 | Lull | Dec. 16, 1952 |
| 2,701,655 | Crile | Feb. 8, 1955 |